(12) United States Patent
Osias

(10) Patent No.: US 7,089,233 B2
(45) Date of Patent: Aug. 8, 2006

(54) METHOD AND SYSTEM FOR SEARCHING FOR WEB CONTENT

(75) Inventor: Michael James Osias, Budd Lake, NJ (US)

(73) Assignee: International Business Machines Corporation, Armonk, NY (US)

(*) Notice: Subject to any disclaimer, the term of this patent is extended or adjusted under 35 U.S.C. 154(b) by 244 days.

(21) Appl. No.: 09/947,866

(22) Filed: Sep. 6, 2001

(65) Prior Publication Data
US 2003/0046275 A1  Mar. 6, 2003

(51) Int. Cl.
G06F 17/30 (2006.01)
G06F 7/00 (2006.01)

(52) U.S. Cl. ............................. 707/4; 707/10
(58) Field of Classification Search ............... 707/2–5, 707/7, 10, 102, 100, 104.1; 709/201–203, 709/228–229, 225, 217–219; 715/501.1, 715/513, 517, 744, 500, 506, 522, 738; 705/10, 705/102
See application file for complete search history.

(56) References Cited

U.S. PATENT DOCUMENTS

| | | | | |
|---|---|---|---|---|
| 5,765,150 A * | 6/1998 | Burrows | ........................ | 707/5 |
| 5,797,008 A | 8/1998 | Burrows | ..................... | 395/612 |
| 5,802,518 A * | 9/1998 | Karaev et al. | ................ | 707/9 |
| 5,832,494 A | 11/1998 | Egger et al. | ................ | 707/102 |
| 5,835,087 A | 11/1998 | Herz et al. | .................. | 345/327 |
| 5,835,905 A | 11/1998 | Pirolli et al. | ................... | 707/3 |
| 5,890,172 A * | 3/1999 | Borman et al. | ............. | 707/501 |
| 5,895,470 A | 4/1999 | Pirolli et al. | ................ | 707/102 |
| 5,974,455 A * | 10/1999 | Monier | ...................... | 709/223 |
| 6,016,494 A * | 1/2000 | Isensee et al. | ............. | 707/102 |
| 6,131,110 A * | 10/2000 | Bates et al. | ................. | 709/203 |
| 6,133,916 A * | 10/2000 | Bukszar et al. | ............ | 715/744 |
| 6,145,003 A * | 11/2000 | Sanu et al. | ................. | 709/225 |
| 6,163,779 A * | 12/2000 | Mantha et al. | ............. | 707/100 |
| 6,182,072 B1 * | 1/2001 | Leak et al. | ................... | 707/10 |
| 6,185,598 B1 * | 2/2001 | Farber et al. | .............. | 709/200 |
| 6,209,036 B1 * | 3/2001 | Aldred et al. | .............. | 709/229 |
| 6,226,645 B1 * | 5/2001 | Bae et al. | ..................... | 707/10 |
| 6,256,028 B1 * | 7/2001 | Sanford et al. | ............ | 345/353 |
| 6,313,855 B1 * | 11/2001 | Shuping et al. | ............ | 715/854 |
| 6,594,654 B1 * | 7/2003 | Salam et al. | ................ | 707/206 |
| 6,638,314 B1 * | 10/2003 | Meyerzon et al. | .......... | 715/513 |
| 6,643,641 B1 * | 11/2003 | Snyder | ......................... | 707/4 |
| 6,819,339 B1 * | 11/2004 | Dowling | ..................... | 715/738 |
| 2001/0047375 A1 * | 11/2001 | Fest | ............................ | 707/526 |
| 2002/0087515 A1 * | 7/2002 | Swannack et al. | ............ | 707/2 |

* cited by examiner

Primary Examiner—Greta Robinson
Assistant Examiner—Jacques Veillard
(74) Attorney, Agent, or Firm—William E. Schiesser; Hoffman, Warnick & D'Alessandro LLC (57) ABSTRACT

The present invention provides a method and system for searching for web content. Specifically, the present invention provides a system and method for retrieving web content from designated web pages and hyperlinks, indexing the retrieved web content in a local database, and searching the local database for desired web content. Retrieved content is indexed in the local database so that future access of the web content can be more efficient.

21 Claims, 5 Drawing Sheets

METHOD AND SYSTEM FOR SEARCHING FOR WEB CONTENT

BACKGROUND OF THE INVENTION

1. Technical Field

The present invention generally relates to a method and system for searching for web content. Specifically, the present invention relates to a method and system for retrieving web content at designated web addresses and hyperlinks, and then indexing the retrieved content in a local database for future efficient access.

2. Background Art

As the use of the Internet becomes more pervasive, individuals and business entities are increasingly using the Internet as a tool for obtaining information. For example, a financial advisor might check numerous World Wide Web sites (web sites) for current financial news on a regular basis. Currently, the financial advisor generally performs his/her searches by entering keywords into a search engine. The search engine will then utilize a program known as a "spider" or "crawler" that will visit and read web sites searching for the entered keyword. Web sites where the keyword is located will be identified for the financial advisor, who can then visit each web site on his/her own (e.g., by clicking on a hyperlink). Alternatively, the financial advisor might already know the specific web sites that he/she wishes to visit. In this case, the financial advisor would visit each web site individually and manually retrieve any desired web content.

Under both alternatives, the financial advisor is forced to perform numerous activities in order to retrieve desired web content. Such a task is highly inefficient and can greatly reduce the productivity of the financial advisor. This is especially true if the financial advisor retrieves web content on a regular basis. In addition, when retrieving web content from numerous different locations, searching, mining, analyzing, and/or archiving the web content can be a time consuming task.

Heretofore, attempts have been made to overcome these inefficiencies by providing web-searching systems. One such example is shown in U.S. Pat. No. 6,145,003 to Sanu et al. Sanu et al., however, fails to provide a system whereby web content can be retrieved from specific web pages according to pre-designated web addresses and hyperlinks. Specifically, Sanu et al. fails to show a system whereby a user can designate a particular web site, as well as any hyperlinks within the designated web site, from which content should be retrieved. In addition, Sanu et al. fails to show a system whereby web content is actually retrieved and indexed in a local database. In contrast, a user of the system of Sanu et al. must visit each web site to retrieve any desired content.

In view of the foregoing, there exists a need for a method and system for searching for web content. A further need exists for a method and system whereby specific web pages can be designated according to web addresses and hyperlinks so that web content can be automatically retrieved on a scheduled basis. A need also exists for retrieved content to be indexed in a local database so that a user's search will occur at the local database level, as opposed to over the entire World Wide Web.

SUMMARY OF THE INVENTION

The present invention overcomes the drawbacks of existing systems by providing a method and system for searching for web content. Specifically, a user can designate an initial web page, by its web address, from which web content should be retrieved. In addition, the user can designate whether web content should also be retrieved from secondary web pages accessed via hyperlinks within the initial web page. The web content at the designated web pages will be retrieved and statistically indexed in a local database, which can then be accessed by the user. Thus, the present invention provides the capability for web content to be more efficiently searched, mined, analyzed, and archived from a central location.

According to a first aspect of the present invention, a method for searching for web content is provided. The method comprises the steps of: (1) retrieving web content from a first web page at a designated web address and from a second web page accessed through a designated hyperlink in the first web page; and (2) indexing the retrieved content in a database.

According to a second aspect of the present invention, a method for searching for web content is provided. The method comprises the steps of: (1) retrieving web content from a first web page at a designated web address and from a second web page accessed through a designated hyperlink in the first web page; (2) statistically indexing the retrieved web content into a database; (3) searching the database to identify indexed content having terms that match a search term; and (4) retrieving the identified content from the database.

According to a third aspect of the present invention, a method for searching for web content is provided. The method comprises the steps of: (1) designating a web address corresponding to a first web page and a hyperlink in the first web page corresponding to a second web page; (2) retrieving web content from the first and second web pages according to a predetermined retrieval schedule; (3) statistically indexing the retrieved content in a database; (4) searching the database to identify indexed content having terms that match a search term; and (5) retrieving identified content from the database.

According to a fourth aspect of the present invention, a method for searching for web content is provided. The method comprises the steps of: (1) configuring a web crawler by designating a web address, a hyperlink, and a retrieval schedule; (2) initiating the web crawler to retrieve web content from web pages at the designated web address and hyperlink according to the retrieval schedule; (3) indexing the retrieved content in a database; (4) searching the database to identify content having terms that match a search term; and (5) retrieving the identified content from the database.

According to a fifth aspect of the present invention, a system for searching for web content is provided. The system comprises: (1) a configuration system for designating a web address corresponding to a first web page and a hyperlink in the first web page corresponding to a second web page; (2) a retrieval system for retrieving web content from the first and the second web pages; and (3) an indexing system for indexing the retrieved web content in a database.

According to a sixth aspect of the present invention, a system for searching for web content is provided. The system comprises: (1) a configuration system for designating a web address corresponding to a first web page and a hyperlink in the first web page corresponding to a second web page; (2) a retrieval system for retrieving web content from the first and the second web pages; and (3) an indexing system for statistically indexing the retrieved web content in a database; and (4) a search system for identifying and retrieving indexed web content having terms that match a search term from the database.

According to a seventh aspect of the present invention, a program product stored on a recordable medium for searching for web content is provided. The program product comprises: (1) a configuration system for designating a web address corresponding to a first web page and a hyperlink in the first web page corresponding to a second web page; (2) a retrieval system for retrieving web content from the first and the second web pages; and (3) an indexing system for indexing the retrieved web content in a database.

Therefore, the present invention provides a system and method for searching for web content.

BRIEF DESCRIPTION OF THE DRAWINGS

These and other features and advantages of this invention will be more readily understood from the following detailed description of the various aspects of the invention taken in conjunction with the accompanying drawings in which.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

In general, the present invention provides a method and system for searching for web content. Specifically, a user will first designate a web address for a primary web page from which web content is to be retrieved. Next, the user can designate whether hyperlinks to secondary web pages (within the primary web pages) should be followed for additional web content. This capability also extends to hyperlinks within the secondary web pages to additional web pages and so on. Thus, the user can specifically designate any hierarchy of web pages from which web content can be retrieved. In addition, the user can also designate a retrieval schedule for the web content to be retrieved from the designated web pages. Once retrieved, the web content is indexed in a central or local database that can be accessed by the user. Thus, the web content could be searched, mined, analyzed, and/or archived at the local database level instead of over the entire World Wide Web.

Figure 1:
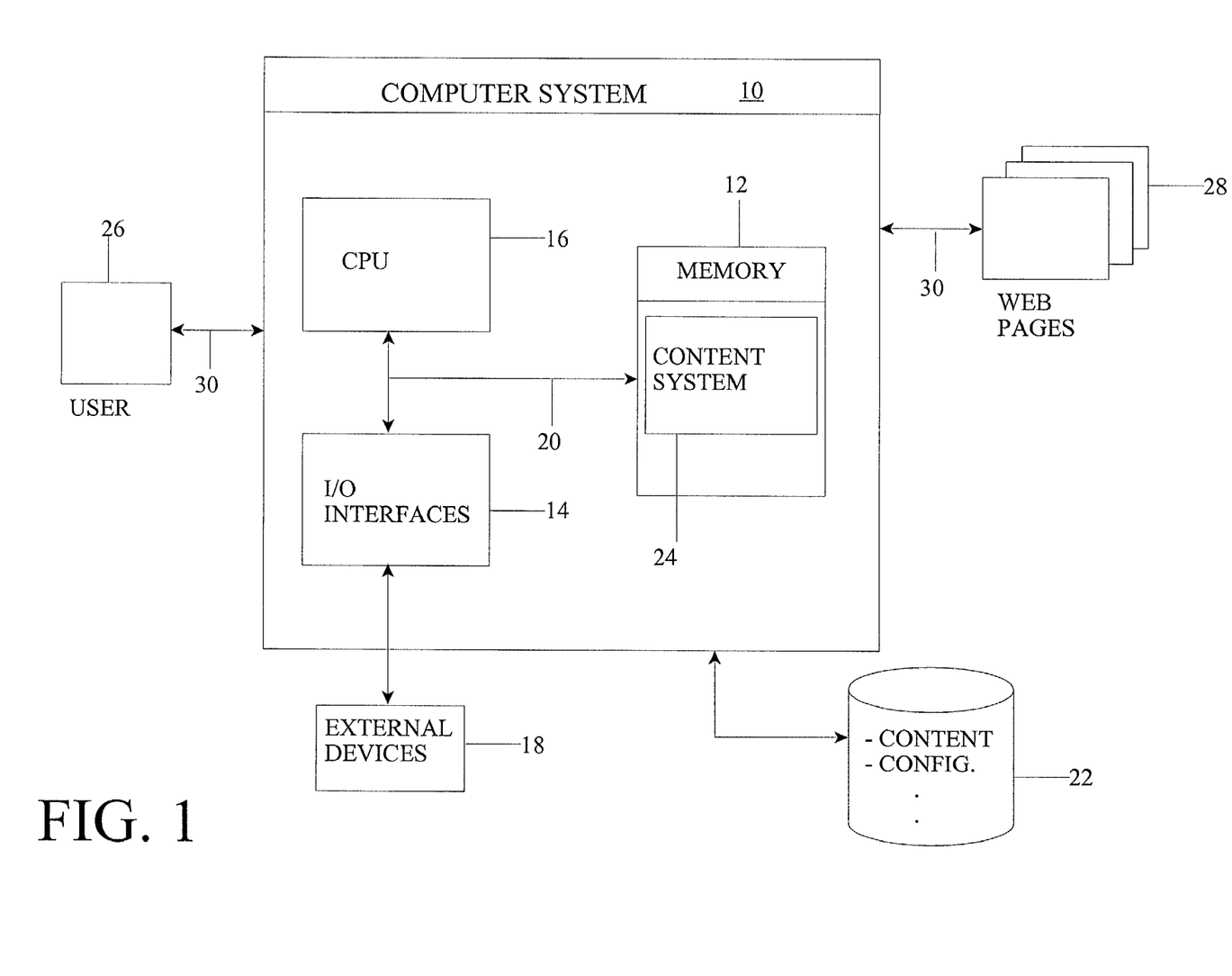
FIG. 1 depicts a computer system having a content system according to the present invention.

Referring now to FIG. 1, a computer/server system 10 that includes the content system 24 of the present invention is shown. Computer system 10 generally comprises memory 12, input/output interfaces 14, a central processing unit (CPU) 16, external devices/resources 18, bus 20, and local database 22. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is content system 24 (shown in FIG. 1 as a software product). Content system 24 will be described in more detail below but generally comprises a method and system for retrieving web content from predetermined web pages 28 and indexing the retrieved content in database 22. This allows user 26 to access indexed web content at the local database 22 level instead of having to search web pages 28.

Database 22 provides storage for information necessary to carry out the present invention. Such information could include, inter alia: (1) web content retrieved from web pages 28; and (2) configuration details predefined by user 26. The predefined configuration details in database 22 preferably include, inter alia: (1) web addresses to web pages; (2) hyperlinks within the web pages to additional web pages; and (3) a retrieval schedule for automatically retrieving the web content from the predetermined web pages. Database 22 may comprise one or more storage devices, such as a magnetic disk drive or an optical disk drive. In another preferred embodiment, database 22 includes data distributed across, for example, a local area network (LAN), wide area network (WAN) or a storage area network (SAN) (not shown). Database 22 may also be configured in such a way that one of ordinary skill in the art may interpret it to include one or more databases.

As will be described in further detail below, user 26 will designate web addresses to primary web pages as well as hyperlinks within the primary web pages to secondary web pages. User 26 could also designate a retrieval schedule so that web content can be retrieved from the primary and secondary web pages at designated dates/times. The web content retrieved from the web pages will be statistically indexed by content system 24 in database 22. User 26 can then search for web content by performing a search of database 22.

Communication with computer system 10 occurs via communication links 30. Communications links 30 can include a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, computer system according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 2:
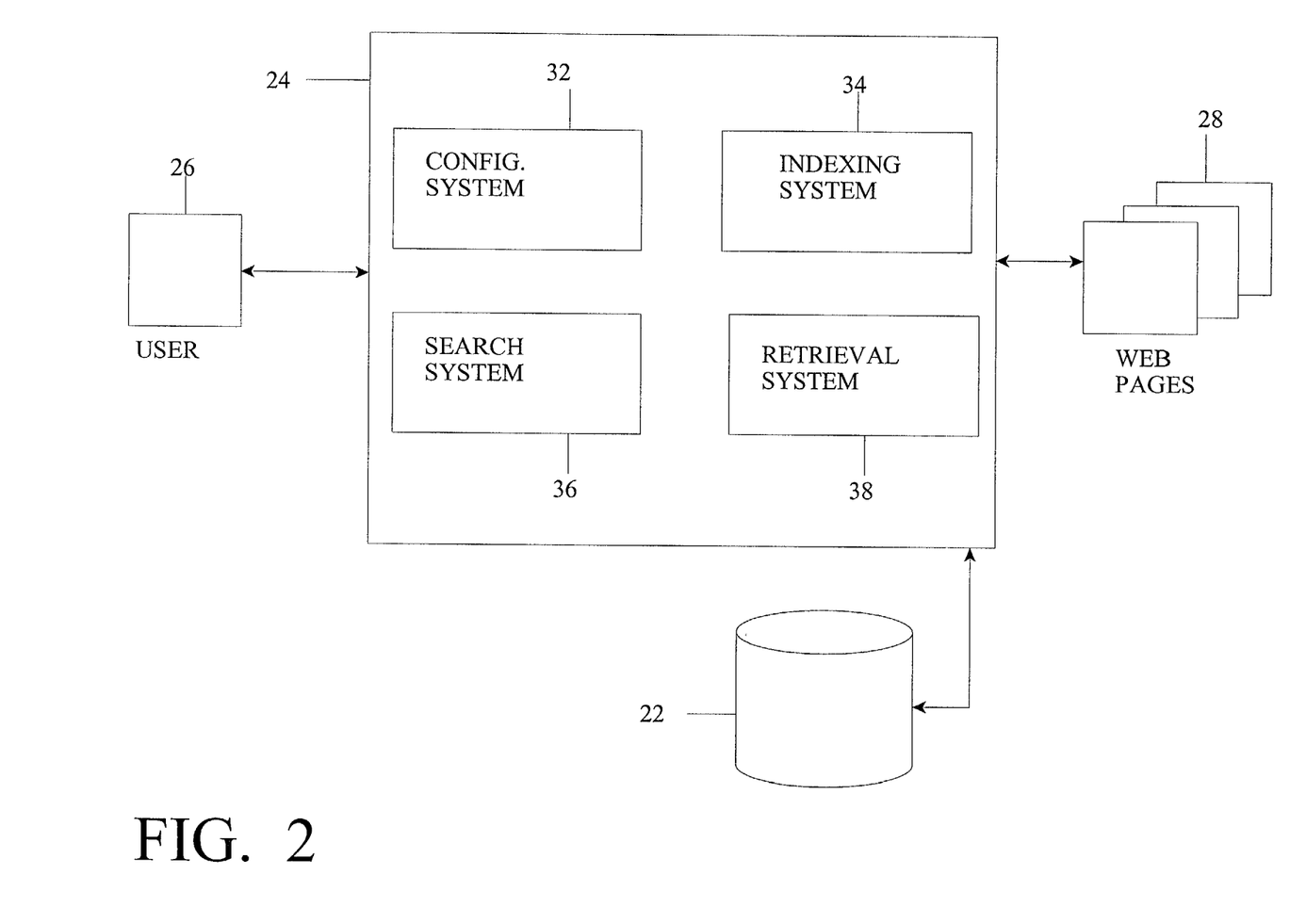
FIG. 2 depicts a box diagram of the content system of FIG. 1.

Referring now to FIG. 2, content system 24 is shown in greater detail. As depicted, content system 24 includes configuration system 32, indexing system 34, search system 36, and retrieval system 38, each of which will be described in detail below. As described above, user 26 will access content system 24 via an interface, (e.g., a web browser) to search for and retrieve web content. To retrieve web content, user 26 will first utilize configuration system 32 to designate configuration details such as web addresses, hyperlinks, and retrieval schedules. Specifically, user 26 can designate web pages 28 according to their web address. Thus, instead of user 26 searching for web pages by entering keywords into a search engine, user 26 will enter the specific web addresses for the web pages from which he/she wishes to receive content. For example, user 26 could enter the web address xyz.com/abc. This would result in content from the web page at this address to be retrieved (as will be further described below). In addition, user 26 can also optionally designate whether web content contained in web pages hyperlinked to the designated web pages should be retrieved. For example, if the web page at the web address xyz.com/abc contained three hyperlinks to other web pages, user 26 could designate whether the hyperlinks should be followed and the web content from the corresponding web pages retrieved. To this end, user 26 could designate that all hyperlinks should be followed. Alternatively, user 26 could designate specific individual hyperlinks that should be followed. Under this feature, configuration system 32 should allow user 26 to designate an infinite hierarchy of hyperlinks to be followed (e.g., web page C that is hyperlinked to web page B that itself is hyperlinked to web page A). By designating specific web addresses and hyperlinks, user 26 can access the web content he/she desires without having to sort through a litany of unrelated web content. In previous systems, a user was forced to either search for web content using a search engine, or by manually accessing each individual web page.

In addition to designating web addresses and hyperlinks, user 26 could also use configuration system 32 to designate a retrieval schedule. Specifically, user 26 may wish to receive the web content from the designated web pages on a routine basis (e.g., daily). Such a schedule can be designated via configuration system 32. It should be appreciated that retrieval schedules could be designated in any fashion. For example, user 26 could designate a different retrieval schedule for each designated web address/hyperlink. Alternatively, user 26 could designate the same retrieval schedule for all designated web addresses/hyperlinks.

Figure 3:
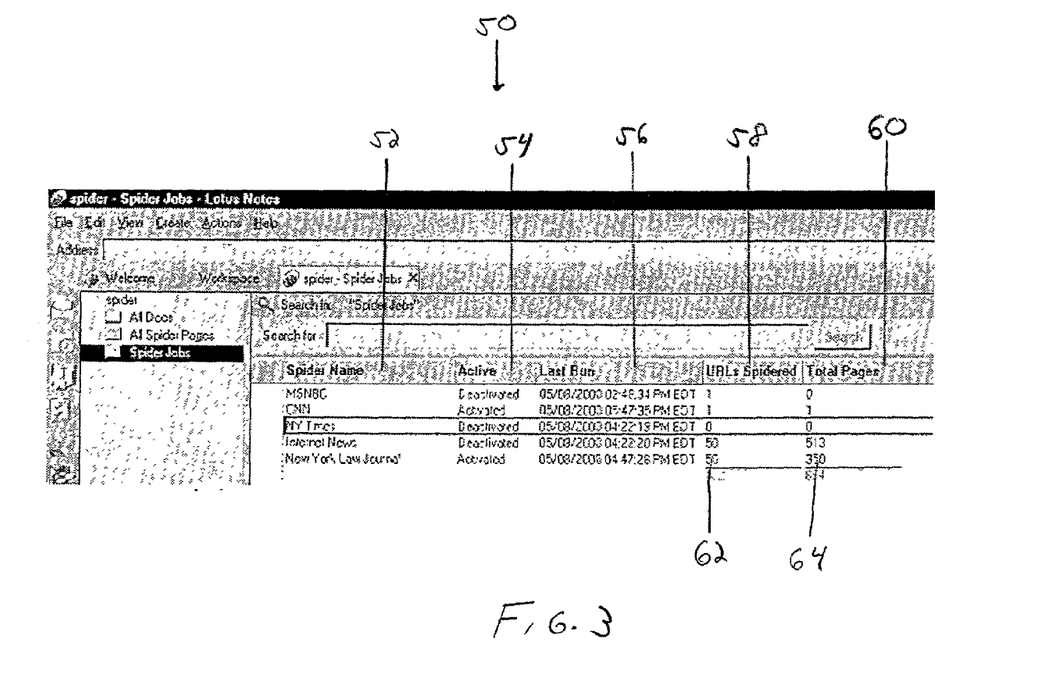
FIG. 3 depicts an exemplary view of a configuration system according to the present invention.

FIG. 3 shows an exemplary view of configuration system 32. As depicted, FIG. 3 shows that the user can group one or more web addresses and hyperlinks into groups referred to herein as spiders. Thus, for example, if the user wished to retrieve web content from several web pages in a single web site, the user would designate the web address (and hyperlink) corresponding to each web page. Then, the user could group the designated web addresses and hyperlinks together. As shown, each spider (i.e., group of web addresses and hyperlinks) can be assigned a spider name 52. For example, as shown in FIG. 3, the user has created a spider group entitled "NY Times." This could indicate that the user has designated one or more web addresses within the NY Times web site from which web content should be retrieved. Also shown for each spider are an active indicator 54, a last run indicator 56, a URL indicator 58, and a total page indicator 60. Active indicator 54 denotes whether each spider group is active, that is, whether the web pages designated by web address in the spider are actively being accessed. Last run indicator 56 indicates when the web pages in the spider were last accessed. URL indicator 58 indicates how many web addresses in the spider were accessed (e.g., how many web addresses the user designated). As depicted, the New York Law Journal spider accessed fifty different web addresses. Total pages indicator 60 indicates the quantity of pages of web content that was retrieved by each spider. For the New York Law Journal spider shown in FIG. 3, three hundred and fifty web pages were retrieved.

It should be understood that the spiders shown in FIG. 3 are intended to be illustrative only. Moreover, it should be appreciated that each spider group could contain any quantity of web addresses. For example, a user who designates a total of ten web addresses could label each web addresses separately, thereby yielding ten groups or spiders.

Referring back to FIG. 2, once all configuration details have been designated, retrieval system 38 will access the designated web pages and retrieve the content therefrom according to the designated retrieval schedule. For example, if user 26 designated ten web addresses and hyperlinks, and a retrieval schedule for all web addresses of "Daily—6:30 AM E.S.T," retrieval system 38 will access the web page at each web address and hyperlink and retrieve the content every morning at 6:30 AM E.S.T. Retrieval system 34 is preferably a web crawler or spider that accesses the web pages at each designated web address and hyperlink. Once accessed, retrieval preferably occurs by copying the HTML web content from the web pages and then storing the web content in database 22 as text. Any graphics included in the web content can be stored in database 22 in any format according to user's 26 preference.

Once the web content is retrieved, indexing system 34 will index (i.e., arrange) the web content in database 22. Specifically, database 22 might contain a high volume of web content originating from numerous web pages. Indexing system 34 allows the web content to be arranged in database 22 for efficient access by user 26. That is, web content in database 22 can be indexed so that the web content most likely to match a later search by user 26 is arranged and searched in database 22 first. In a preferred embodiment, the indexing is statistical. One type of statistical indexing could be based upon a behavioral history of user 26. For example, if user 26 designated ten web pages from which web content was retrieved, and historically user 26 read the web content from web page "A" the most, indexing system could arrange the web content so that the web content from web page "A" is arranged in database 22 first. Thus, when later searched by user 26, the web content from web page "A" is searched first. Alternatively, statistical indexing could be based upon an indexing term or the like. In this case, user 26 could designate an indexing term via indexing system 34. For example, if user 26 designated the indexing term "Dow," indexing system would arrange the retrieved web content in database 22 so that any web content that contains the term "Dow" appeared is arranged first. In the event that numerous sets of web content contained the term "Dow," the web content in which "Dow" appeared the most times could be arranged first. It should be appreciated that the examples given for indexing of web content in database 22 are not intended to be exhaustive and other indexing criteria could be implemented. The purpose of indexing is to provide a search efficient structure that is a representation of the data in database 22 to improve the accuracy and speed of locating web content used by user 26.

Once web content has been retrieved from designated web pages, stored in database 22, and indexed, user 26 can utilize search system 36 to identify specific web content. As such search system 36 could utilize any known searching method (e.g., keywords or search terms). For example, if user 26 desired to view all web content in database 22 pertaining to "IBM," user 26 could enter the search term "IBM" via search system 36. Search system 36 would then access database 22 to identify all web content having the search term "IBM." The search system could also allow the user to designate a search schedule. For example, if the user wishes to read web content based on the search term "IBM" every morning at 9:00 AM, the user could designate this via the search system. Thus, the present invention allows the user to designate both a retrieval schedule for retrieving web content (e.g., every morning at 6:30 AM) as well as a search schedule for searching the indexed web content (e.g., every morning at 9:00 AM) in the database.

Figure 4:
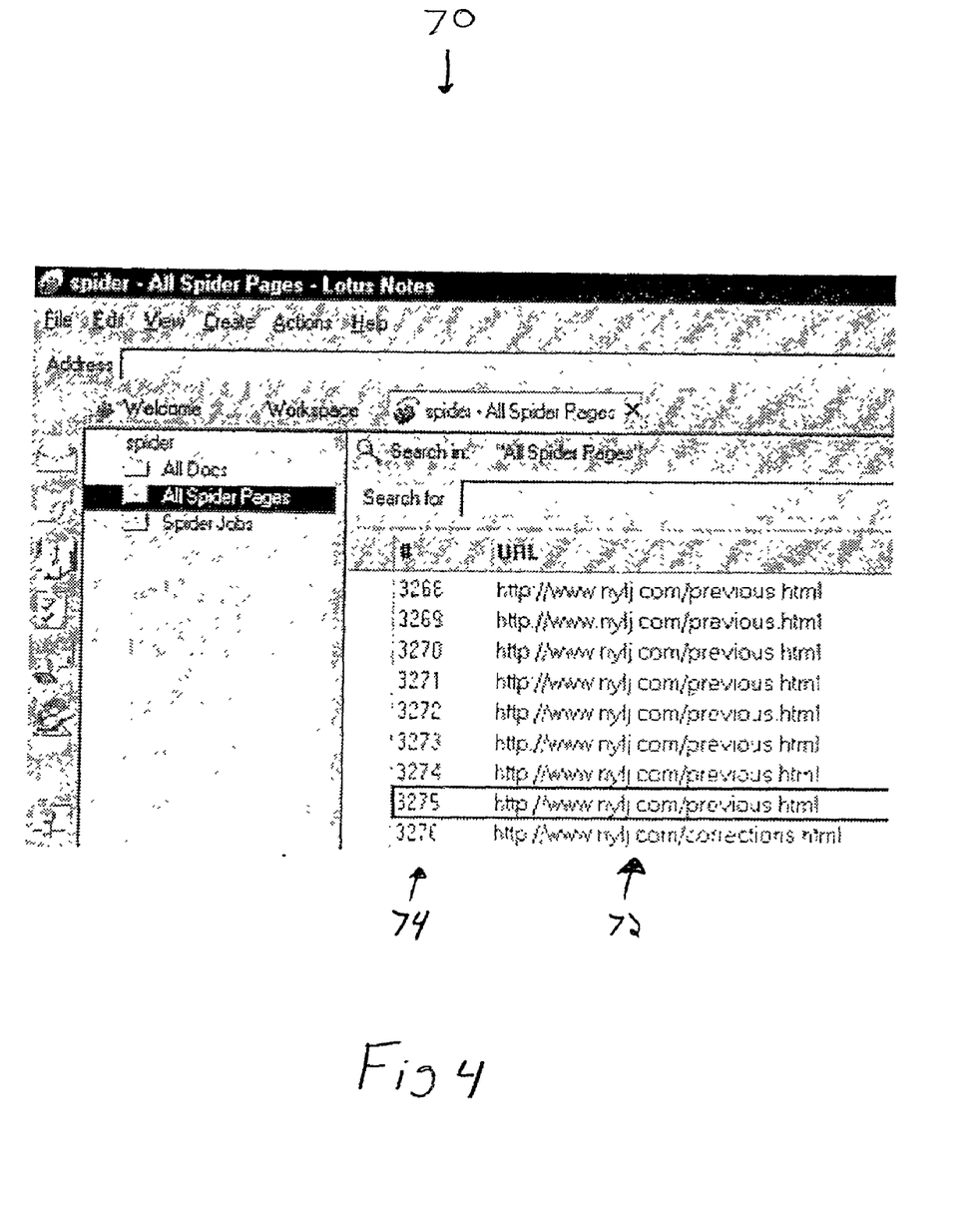
FIG. 4 depicts an exemplary view of search results according to the present invention.

Once matches of the search term are identified in the indexed web content, the user could be presented with the identified web content. This could occur by presenting the user with a view of the web addresses from which the web content was retrieved, as shown in FIG. 4. Specifically, FIG. 4 shows a view 70 of web addresses 72 corresponding to web content that matched the user's search. As depicted, each web address could also be assigned a reference numeral 74. Reference numerals 74 can be any designation useful to the user. For example, reference numerals 74 could correspond to a record location of the corresponding web content in the local database. Once presented with the web addresses 72, the user could then select a particular web address to view the corresponding web content. Since the web content is stored in the local database, retrieval of the selected web content from the database occurs expediently. Moreover, as indicated above, indexing of the web content in the database allows the user's search to be more efficient. Specifically, indexing allows web content to be arranged in the database so that the web content most likely to be used/accessed by the user is searched first. For example, if indexing were based upon the user's historical behavior in reading web content, the web address for the web content that the user reads most frequently would be arranged in the database first. Thus, after entering a search term, search system 36 would search the most frequently read web content first. This would provide the user not only with extremely fast results, but also with the web content that the user is most likely to read.

It should be understood that the web content can be presented to user in any known fashion and the above description is not intended to be exhaustive. For example, the user's search results need not be presented as web addresses as shown in FIG. 4. Rather, the search results could be presented to the user by web content or web page title.

Figure 5:
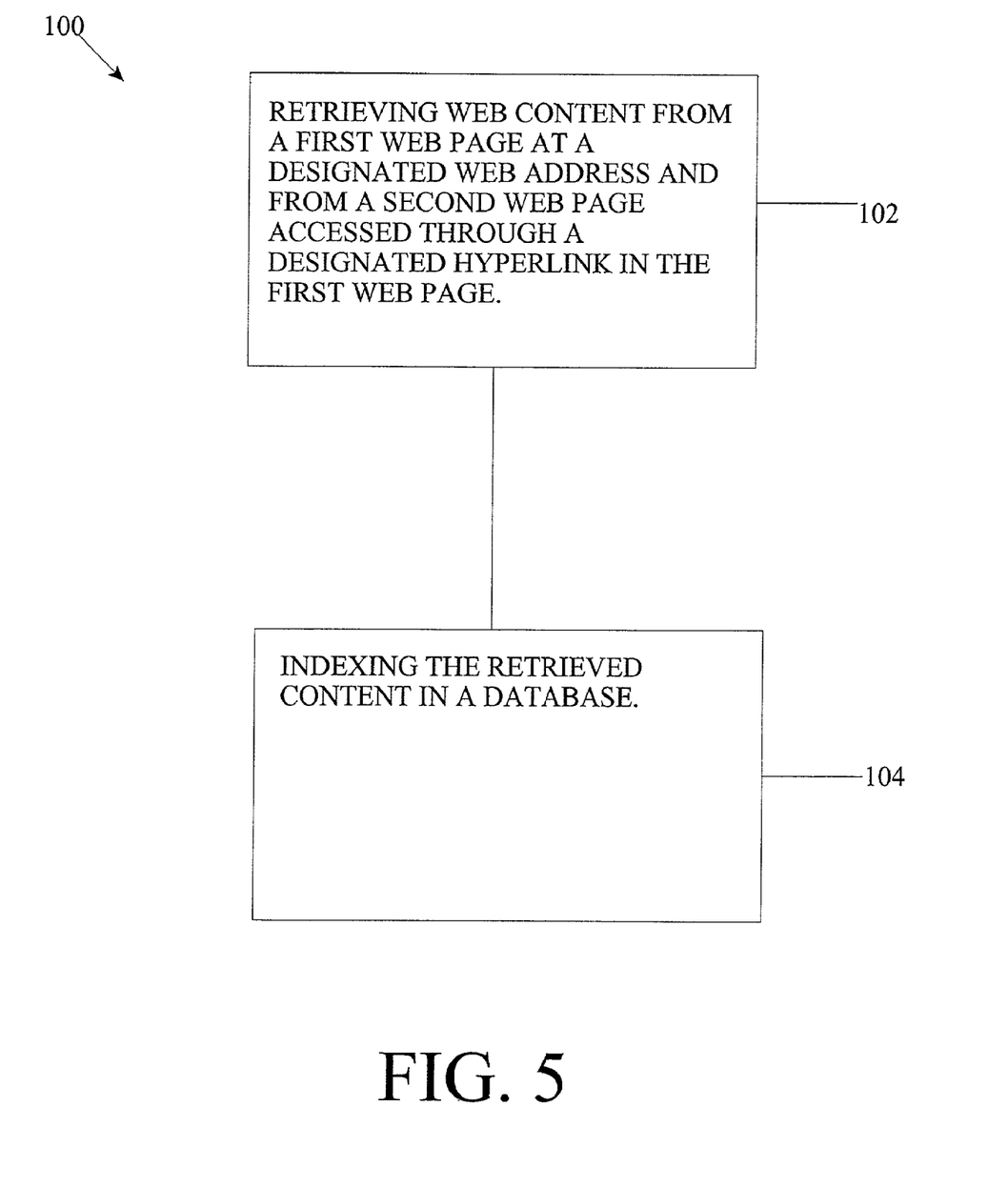
FIG. 5 depicts a method flow chart according to the present invention.

Referring now to FIG. 5 a flow chart of a method 100 according to the present invention is shown. As depicted, first step 102 is to retrieve web content from a first web page at a designated web address and from a second web page accessed through a designated hyperlink in the first web page. Second step 104 of method 100 is to index the retrieved content in a database.

The storage and indexing of web content in one central local database in accordance with the present invention provides the user with the capability to efficiently access (e.g., search, archive, mine, and analyze) the web content. The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for searching for web content, comprising the steps of:
   a user designating a web address corresponding to a first web page to be searched;
   the user designating a hyperlink within the first web page corresponding to a second web page;
   retrieving web content for the user from the first web page and from the second web page; and
   indexing the retrieved content in a database, wherein the indexing is statistical, wherein the statistical indexing is based upon a behavioral history of the user whereby the web content is indexed in the database according to a frequency of previous access by the user.

2. The method of claim 1, further comprising the steps of:
   searching the database to identify indexed content having terms that match a search term; and
   retrieving the identified content from the database.

3. The method of claim 1, further comprising the step of identifying web addresses corresponding to identified content, prior to the retrieving step.

4. The method of claim 1, wherein the searching step is performed according to a predetermined search schedule.

5. The method of claim 1, wherein the retrieving step is performed according to a predetermined retrieval schedule.

6. The method of claim 1, wherein the statistical indexing is based upon an indexing term whereby the web content is indexed in the database according to a frequency that the web content includes terms that match the indexing term.

7. A method for searching fir web content, comprising the steps of:

a user designating a web address corresponding to a first web page to be searched;

the user designating a hyperlink within the first web page corresponding to a second web page;

retrieving web content from the first web page and from the second web page, after the designating steps;

statistically indexing the retrieved web content into a database, wherein the statistical indexing is based upon a behavioral history of the user whereby the web content is indexed in the database according to a frequency of previous access by the user;

searching the database to identify indexed content having terms that match a search term;

identifying web addresses corresponding to identified web content, after the searching step; and retrieving the identified content from the database.

8. The method of claim 7, wherein the searching step is performed according to a predetermined search schedule.

9. The method of claim 7, wherein the retrieving step is performed according to a predetermined retrieval schedule.

10. The method of claim 7, wherein the statistical indexing is based upon an indexing term whereby the web content is indexed in the database according to a frequency that the web content includes terms that match the indexing term.

11. A method for searching for web content, comprising the steps of:

a user designating a web address corresponding to a first web page to be searched;

the user designating a hierarchy of hyperlinks in the first web page corresponding to additional web pages;

retrieving web content from the first and additional web pages according to a predetermined retrieval schedule;

statistically indexing the retrieved content in a database, wherein the statistical indexing is based upon a behavioral history of the user whereby the web content is indexed in the database according to a frequency of previous access by the user;

searching the database to identify indexed content having terms that match a search term; and retrieving identified content from the database.

12. The method of claim 11, wherein the retrieving step is performed according to a retrieval schedule, and wherein the searching step is performed according to a searching schedule.

13. A method for searching for web content, comprising the steps of:

a user configuring a web crawler by designating a web address to be searched, a hyperlink within a web page corresponding to the web address, and a retrieval schedule;

initiating the web crawler to retrieve web content from the web pages at the designated web address and from a web page corresponding to the hyperlink according to the retrieval schedule;

indexing the retrieved content in a database, wherein the indexing is statistical, wherein the statistical indexing is based upon a behavioral history of the user whereby the web content is indexed in the database according to a frequency of previous access by the user;

searching the database to identify content having terms that match a search term; and retrieving the identified content from the database.

14. The method of claim 13, wherein the statistical indexing is based upon an indexing term whereby the web content is indexed in the database according to a frequency that the web content includes terms that match the indexing term.

15. A system for searching for web content, comprising:

a configuration system for a user to designate a specific web address corresponding to a first web page to be searched and for the user to designate a specific hyperlink in the first web page corresponding to a second web page;

a retrieval system for retrieving web content from the first and the second web pages; and an indexing system for indexing the retrieved web content in a database, wherein the indexing is statistical, wherein the statistical indexing is based upon a behavioral history of the user whereby the web content is indexed in the database according to a frequency of previous access by the user.

16. The system of claim 15, further comprising a search system for identifying and retrieving indexed web content in the database having terms that match a search term.

17. The system of claim 15, wherein the statistical indexing is based upon an indexing term whereby the web content is indexed in the database according to a frequency that the web content includes terms that match the indexing term.

18. A system for searching for web content, comprising:

a configuration system for a user to designate a specific web address corresponding to a first web page to be searched and for the user to designate a hierarchy of hyperlinks in the first web page corresponding to additional web pages;

a retrieval system for retrieving web content from the first and the second web pages according to a designated retrieval schedule; and an indexing system for statistically indexing the retrieved web content in a database, wherein the statistical indexing is based upon a behavioral history of the user whereby the web content is indexed in the database according to a frequency of previous access by the user; and a search system for identifying and retrieving indexed web content having terms that match a search term from the database.

19. A program product stored on a recordable medium for searching for web content, comprising:

a configuration system, for a user to designate a specific web address corresponding to a first web page to be searched and for the user to designate a specific hyperlink in the first web page corresponding to a second web page;

a retrieval system, for retrieving web content from the first and the second web pages; and an indexing system for indexing the retrieved web content in a database according to an indexing criterion wherein the indexing is statistical, wherein the statistical indexing is based upon a behavioral history of the user whereby the web content is indexed in the database according to a frequency of previous access by the user.

20. The program product of claim 19, further comprising a search system for identifying and retrieving indexed web content in the database having terms that match a search term.

21. The program product of claim 19, wherein the statistical indexing is based upon an indexing term whereby the web content is indexed in the database according to a frequency that the web content includes terms that match the indexing term.

* * * * *